(12) United States Patent
Murphy et al.

(10) Patent No.: US 10,409,572 B2
(45) Date of Patent: Sep. 10, 2019

(54) COMPILED FILE NORMALIZATION

(71) Applicant: Red Hat, Inc., Raleigh, NC (US)

(72) Inventors: Grant Murphy, Annerley (AU); David Jorm, Indooroopilly (AU); Arun Neelicattu, Brisbane (AU); Stephen Milner, Raleigh, NC (US)

(73) Assignee: RED HAT, INC., Raleigh, NC (US)

( * ) Notice: Subject to any disclaimer, the term of this patent is extended or adjusted under 35 U.S.C. 154(b) by 77 days.

(21) Appl. No.: 14/194,116

(22) Filed: Feb. 28, 2014

(65) Prior Publication Data
US 2015/0248288 A1 Sep. 3, 2015

(51) Int. Cl.
*G06F 7/20* (2006.01)
*G06F 8/30* (2018.01)
*G06F 8/41* (2018.01)
*G06F 16/00* (2019.01)
*G06F 9/445* (2018.01)

(52) U.S. Cl.
CPC ............... *G06F 8/447* (2013.01); *G06F 7/20* (2013.01); *G06F 8/315* (2013.01); *G06F 8/41* (2013.01); *G06F 9/44521* (2013.01); *G06F 16/00* (2019.01); *G06F 8/427* (2013.01)

(58) Field of Classification Search
CPC .......... G06F 7/20; G06F 8/36; G06F 8/40–52; G06F 8/70–71; G06F 17/30985; G06F 17/30988
See application file for complete search history.

(56) References Cited

U.S. PATENT DOCUMENTS

| | | | |
|---|---|---|---|
| 6,138,269 A | 10/2000 | Ball et al. | |
| 6,298,353 B1 | 10/2001 | Apte | |
| 6,865,733 B2 | 5/2005 | Broussard | |
| 7,096,463 B2* | 8/2006 | Pisupati et al. | 717/168 |
| 7,200,842 B1* | 4/2007 | Susser | G06F 9/445 717/159 |
| 7,213,240 B2 | 5/2007 | Wong et al. | |
| 7,240,341 B2* | 7/2007 | Plummer | G06F 9/44563 717/148 |
| 8,296,745 B2 | 10/2012 | Simon et al. | |
| 8,352,484 B1* | 1/2013 | Schneider | 707/758 |
| 8,458,672 B2* | 6/2013 | Forster | G06F 9/4493 717/136 |
| 8,825,689 B2* | 9/2014 | Fedorenko et al. | 707/758 |

(Continued)

FOREIGN PATENT DOCUMENTS

JP 2000357097 A * 12/2000

OTHER PUBLICATIONS

Java Synthetic Class, Method, Field, javapapers, 2013, 3 pages, [retrieved on Nov. 19, 2015], Retrieved from the Internet: <URL:https://web.archive.org/web/20130417085221/http://javapapers.com/core-java/java-synthetic-class-method-field>.*

(Continued)

*Primary Examiner* — Geoffrey R St Leger
(74) *Attorney, Agent, or Firm* — Haynes and Boone LLP

(57) ABSTRACT

A method performed by a computing system includes, with the computing system, extracting non-compiler specific components from a first compiled file, the first compiled file being compiled from a piece of source code, and with the computing system, rearranging the extracted non-compiler specific components into a normalized order, the normalized order being used to consistently arrange a plurality of compiled files.

16 Claims, 6 Drawing Sheets

(56) References Cited

U.S. PATENT DOCUMENTS

| | | | | |
|---|---|---|---|---|
| 2004/0098712 | A1* | 5/2004 | Pisupati et al. | 717/153 |
| 2004/0117787 | A1* | 6/2004 | Sowa et al. | 717/174 |
| 2005/0154899 | A1* | 7/2005 | Marvel | G06F 21/64 |
| | | | | 713/187 |
| 2007/0256069 | A1* | 11/2007 | Blackman | G06F 8/433 |
| | | | | 717/170 |
| 2013/0311496 | A1* | 11/2013 | Fedorenko et al. | 707/758 |
| 2014/0026121 | A1* | 1/2014 | Jackson | G06F 9/44521 |
| | | | | 717/124 |
| 2015/0128032 | A1* | 5/2015 | Staykov | G06F 21/64 |
| | | | | 715/239 |

OTHER PUBLICATIONS

Zemlyanskaya, Svetlana, Arrange your code automatically with PhpStorm (re)arranger, PhpStorm Blog, Mar. 8, 2013, 4 pages, [retrieved on Jun. 22, 2017], Retrieved from the Internet: <URL:https://blog.jetbrains.com/phpstorm/2013/03/arrange-your-code-automatically-with-phpstorm-rearranger/>.*

Code Style.PHP, JetBrains, 2017, 22 pages, [retrieved on Dec. 28, 2017], Retrieved from the Internet: <URL:https://www.jetbrains.com/help/phpstorm/code-style-php.html.*

Merunka, V., et al., Normalization Rules of the Object-Oriented Data Model, Proceedings of the International Workshop on Enterprises & Organizational Modeling and Simulation, Article No. 13, Jun. 8-9, 2009, 14 pages, [retrieved on Apr. 15, 2019], Retrieved from the Internet: <URL:http://dl.acm.org/>.*

Davis, I., et al., From Whence It Came: Detecting Source Code Clones by Analyzing Assembler, 17th Working Conference on Reverse Engineering, Oct. 13-16, 2010, pp. 242-246, [retrieved on Apr. 15, 2019], Retrieved from the Internet: <URL:http://ieeexplore.ieee.org/>.*

* cited by examiner

COMPILED FILE NORMALIZATION

BACKGROUND

The present disclosure relates generally to computer readable code, and more particularly to computer readable code that includes class files.

Due to the complexity of software, it is difficult to reliably determine if a particular class file has been compiled from a particular piece of source code. Source code is the originally written code that is in a human-readable state. A compiler is used to convert the source code into a machine-readable format. For example, a piece of software may be written in java. Various compilers, sometimes referred to as java development kits, will change the human readable java code into java bytecode. The java bytecode is placed into a class file. Java bytecode is able to be read by a java virtual machine that is designed to run on various platforms.

It is often desirable to determine if a particular class file was derived from a particular piece of source code. For example, there may be a number of known pieces of source code that have security vulnerabilities. But, two class files that are compiled from the same source code may be different if they were compiled by different compilers. Thus, when comparing a particular class file with several class files from a database to see if any of them are the same, an actual match may be missed due to compiler differences.

Accordingly, it would be desirable to provide improved systems and methods for comparing class files.

SUMMARY

According to certain illustrative examples, a method performed by a computing system includes, with the computing system, extracting non-compiler specific components from a first compiled file, the first compiled file being compiled from a piece of source code, and with the computing system, rearranging the extracted non-compiler specific components into a normalized order, the normalized order being used to consistently arrange a plurality of compiled files.

According to certain illustrative examples, a computing system includes a processor and a memory comprising machine readable instructions that when executed by the processor, cause the system to, for each of a plurality of class files, parse the class file, remove compiler identification information from the class file, remove constant pool definitions from the class file, and output remaining contents of the class file to a temporary file in a normalized order, perform a hash function on each temporary file to obtain a plurality of hash results, and compare the hash results to determine whether the plurality of class files were compiled from a same piece of source code.

According to certain illustrative examples, a non-transitory, machine-readable medium comprising a set of machine readable instructions that when executed by a processor, cause the processor to extract non-compiler specific components from a first compiled file, the first compiled file being compiled from a piece of source code, rearrange the extracted non-compiler specific components into a normalized order, perform a hash function on the normalized components to obtain a first hash result, compare the first hash result with a set of hash results derived from pieces of source code having a specific characteristic, each of the set of hash results being obtained from the normalized order of non-compiler specific components of compiled files, the compiled files being from the pieces of source code having the specific characteristic.

Figure 1:
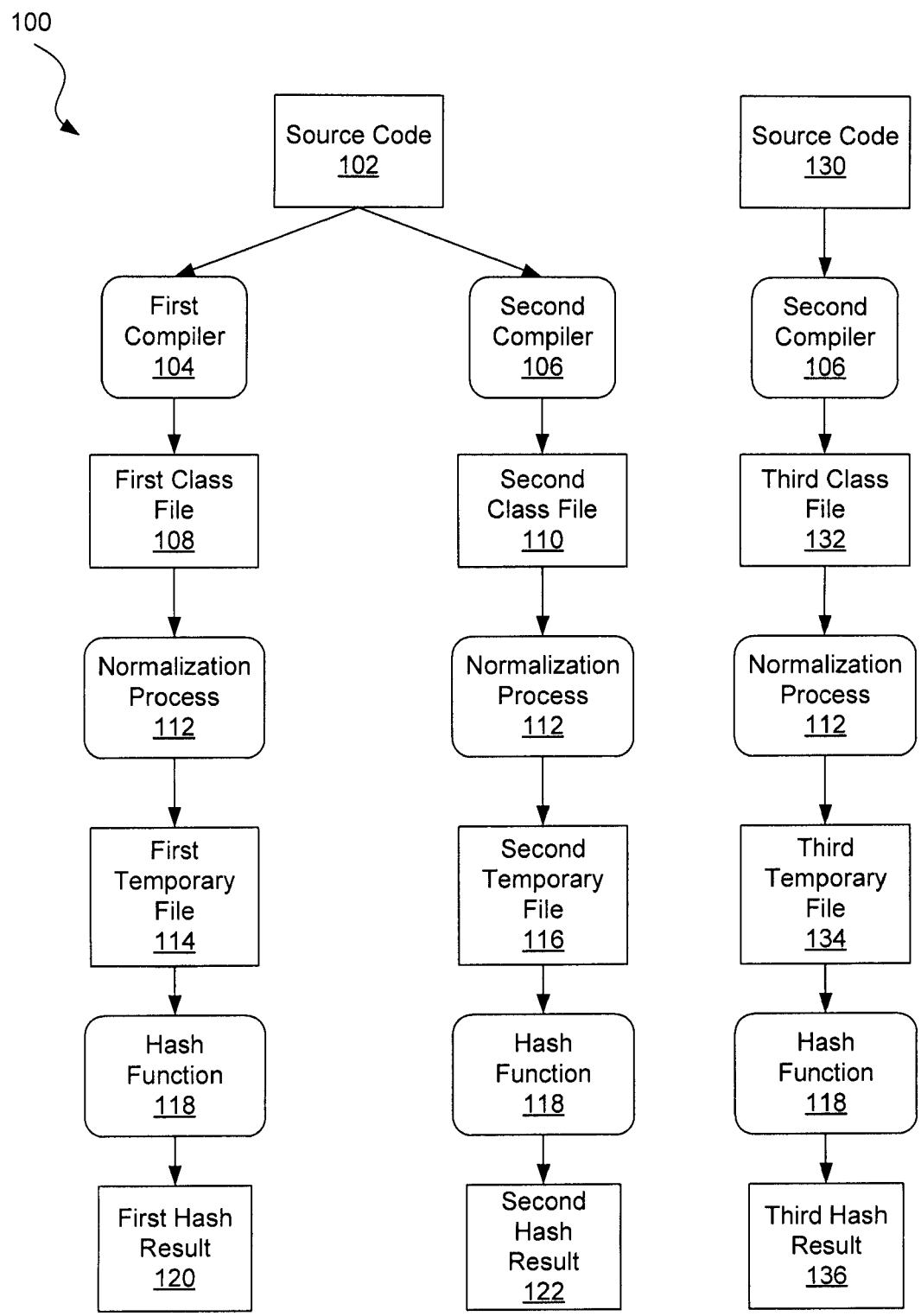
FIG. 1 is a diagram illustrating class file normalization, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The methods and principles described herein are applicable to a variety of programming languages and compiled files associated with those programming languages. For purposes of discussion, the following is presented with the example of java code. When java code is compiled, it is placed into a class file. In other programming languages, such as C++, compiled source code is not referred to as a class file. The term compiled file as used herein may apply to any type of file that is compiled from a piece of source code.

It is often desirable to determine if a particular class file was derived from a particular piece of source code. For example, there may be a database of class files that have been compiled from a particular source code known to have a particular characteristic, such as a security vulnerability. One way to efficiently compare class files is to apply a hash function to the class files and compare the hash results. A hash function applies a particular function to a file to produce a particular output, which is referred to as a hash result. If the two class files are identical, the hash results for those two class files will also be identical.

But, because of various differences in compilers, two class files compiled from the same source code but with different compilers may produce different hash results when the hash function is applied. Thus, when comparing a hash result of a particular class file with a database of hash results, there may be no match even though the source code form the particular class file matches the source code for one of the hash results in the database. The principles described herein provide a method for normalizing class files so that hash results will match despite differences in compilers used to compile the class files.

According to certain illustrative examples, before applying the hash function, the compiler identification information is removed from the class file. Various class files may include metadata that indicates what compiler compiled the class file. The compiler identification data may also include the compiler version number and information that indicates the compiler settings at the time the class file was compiled. All this information is removed for the purpose of applying the hash function.

Additionally, the class file is parsed so that the class constant pool can be removed. The class constant pool from the class file. The constant pool is a table that includes literal constant values such as numbers, strings, identifier names, references to classes and methods, and type descriptors. Different compilers often utilize the constant pool differently. This causes the different compilers to produce slightly different class files.

After the compiler identification information and the constant pool have been removed, the remaining portions of the class file are put into a normalized order. For example, the normalized order may define a specific order for different content types such as a class source file name, a class access flag, a class name string resolved from the constant pool, the class name string of any extended classes resolved form the constant pool, and the string value of interface implemented by the class as resolved from the constant pool.

After the remaining contents of the class file have been arranged in the normalized order, the hash function is applied to produce a hash result. If the hash results from a database have also been normalized as described above, then the hash results of a normalized class file will more likely match the hash results from the database if compiled from the same source code, despite differences in compiler settings.

FIG. 1 is a diagram illustrating class file normalization 100. As described above, a piece of source code 102, 130 is compiled by a compiler 104, 106 to produce a class file 108, 110, 132. The normalization process 112 is then applied to the class files 108, 110, 132. In some examples, the normalization process 112 produces temporary files 114, 116, 134 containing the normalized order of class contents. The hash function 118 is then applied to the temporary files 114, 116, 134 to produce the hash results 120, 122, 136.

A particular piece of source code 102 may be compiled by different compilers 104, 106. As described above, source code is a human readable language in which a piece of software is originally written. A compiler 104, 106 is used to change the source code into a machine readable language. In the case of java code, the compiler produces a class file that includes bytecode. Bytecode is executable by a java virtual machine. A java virtual machine then transfers the bytecode to a format that is executable on whatever platform the java virtual machine is running. In some cases, such as with C++ code, the compiler produces an assembly language that is specific to the processor architecture of the machine that is to execute the code. The assembly code is directly changed to binary code for execution by the processor.

Different compilers 104, 106 may produce slightly different class files 108, 110. While the two class files 108, 110 compiled from the same source code 102 may perform identically, the bytecode for the two class files 108, 110 may be different enough that when a hash function is applied, a different hash result is produced. For example, the first compiler 104 may be developed by one entity and the second compiler 106 may be developed by a different entity. Both compilers 108, 110 may perform slightly differently to produce slightly different class files 108, 110.

As described above, the normalization process 112 is used to make the hash results of different class files 108, 110 produced by different compilers more likely to match. Particularly, the normalization process 112 may include parsing the class file so that certain components may be removed. Specifically, the compiler identification information is removed from the class file. The compiler identification information may include metadata that indicates what compiler compiled the class file. The compiler identification data may also include the compiler version number and information that indicates the compiler settings at the time the class file was compiled.

The normalization process 112 also removes the constant pool table. The constant pool is a table that includes literal constant values such as numbers, strings, identifier names, references to classes and methods, and type descriptors. Different compilers often utilize the constant pool differently. This causes the different compilers to produce slightly different class files.

After the compiler identification information and the constant pool have been removed, the normalization process continues by placing the remaining portions of the class file are put into a normalized order. For example, the normalized order may define a specific order for different content types such as a class source file name, a class access flag, a class name string resolved from the constant pool, the class name string of any extended classes resolved form the constant pool, and the string value of interface implemented by the class as resolved from the constant pool. Various different orders may be used as the normalized order. As long as both class files 108, 110 have had the same normalization process applied, the normalization process 112 will produce the desired results.

In one example, the normalized order may place the class file contents in the following order:
  The class source file name
  The class access flags
  The class name string resolved from the constant pool
  The class name string of any classes extended resolved from constant pool
  The string value of the interfaces implemented by this class as resolved from the constant pool
  For each field belonging to the class
    The access flags for the field
    The name of the field as resolved from the constant pool
    The field signature as resolved from the constant pool
  For each method and method belonging to the class
    The access flags for the field
    The name of the field as resolved from the constant pool
    The method signature as resolved from the constant pool
    The method's bytecode instructions In some examples, the computing system that performs the normalization process may place the normalized class file into a temporary file 114, 116. Because the normalized class file is used for the purpose of applying the hash function, the temporary files 114, 116 may be discarded after the hash results 120, 122 are obtained. In some examples, the temporary files 114, 116 exist only in working memory and are not transferred to a non-volatile memory store. In some examples, the temporary files are not treated as files by the system. Rather, the normalized contents of the class file are put into an output buffer. After the hash function has been applied to the normalized class file contents within the output buffer, the output buffer may be emptied.

The hash function 118 may be a standard hash function typically used to produce a particular output based on an input. For example, the input may be a block of data and the output may be a fixed-size bit string. The hash function 118 is designed such that any change in the input block of data will, in almost all cases, change the hash result 120, 122.

After the normalization process 112 normalizes the class file contents, the hash results 120, 122 should match because they are derived from the same source code 102. If the hash function 118 were to be applied to the first class file 108 and the second class file 110, it is possible that the hash results would not match because of the differences between the first compiler 104 and the second compiler 106.

Using the normalization process 116 described herein, the hash result 120 from a single class file 108 can be compared with several other hash results to see if there are any matches. For example, the first hash result can be compared with a third hash result 136 obtained by using a compiler 104 to compile a piece of source code 130 into a class file 132. That class file then receives the normalization process 112 to create a temporary file 134 to which the hash function 118 is applied, resulting in the third hash result 136. But, because the third hash result 136 is derived from a different piece of source code, the hash results 120, 132 will not match.

Figure 2:
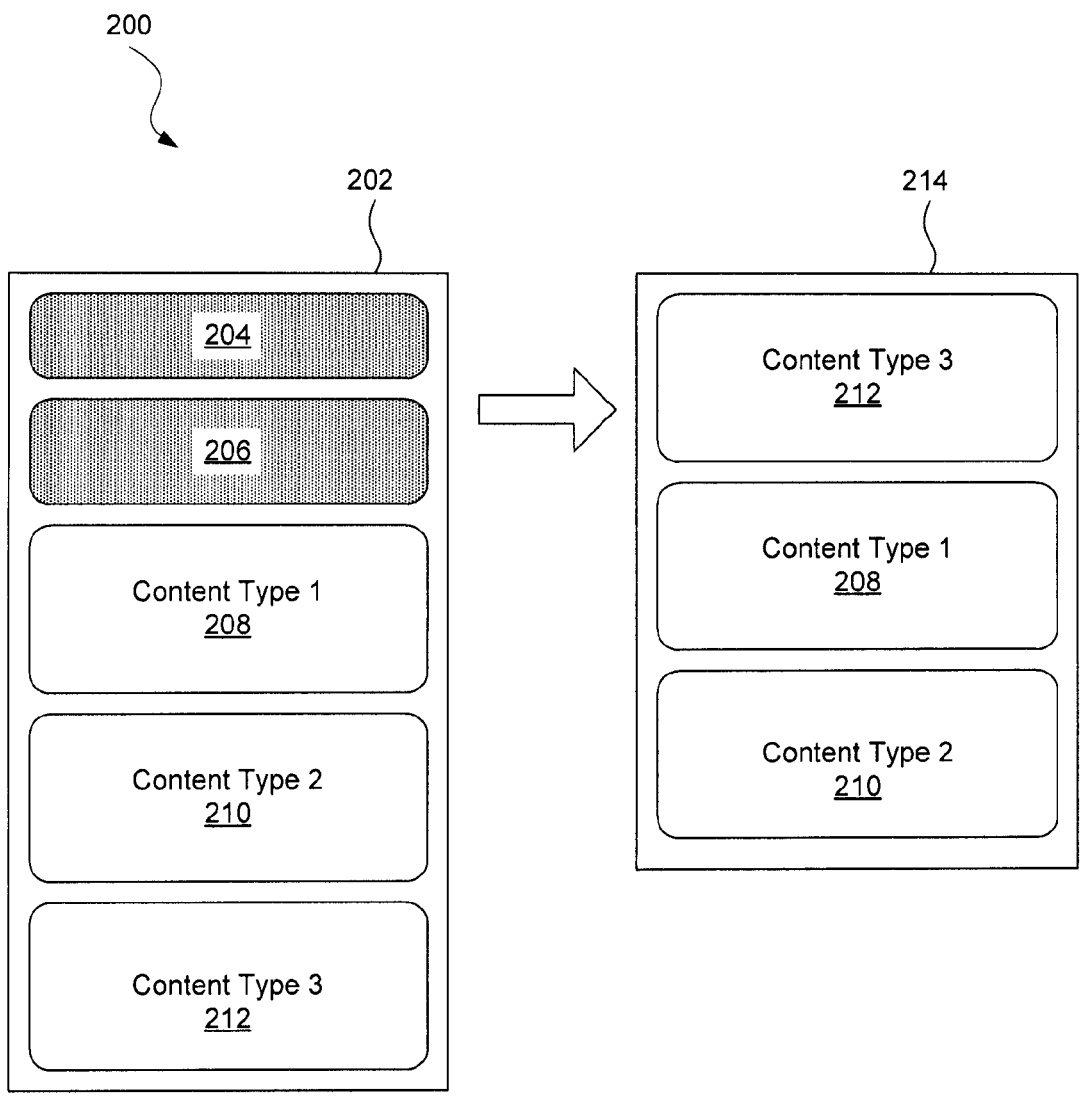
FIG. 2 is a diagram illustrating a normalized order of a temporary file, according to one example of principles described herein.

FIG. 2 is a diagram illustrating a normalized order of a temporary file. As described above, certain contents 204, 206 are removed from the original class file 202 for the purpose of performing the hash function. Additionally, some contents 208, 210, 212 are rearranged to be in a normalized order.

The compiler identification information 204 is removed as described above. Because different compilers produce class files with different compiler identification information 204, such content should be removed before performing the hash function. Additionally, the class constant pool 206 is removed. As described above, the constant pool 206 is a table that includes literal constant values such as numbers, strings, identifier names, references to classes and methods, and type descriptors. The constant pool points to content throughout the class file. Various compilers may order the contents within the class pool and the constant pool differently, which leads to different hash results on class files from the same source code that are compiled with different compilers.

Additionally, as described above, the remaining contents 208, 210, 212 of the class file are rearranged to be in a normalized order. The normalized order is one that is consistent across several class files being compared using the hash function as described above. For example, content type 1 208 may represent the contents related to class fields, such as the access flags for the field, the name of the field as resolved from the constant pool, the field signature as resolved from the constant pool. Content type 2 210 may represent content related to methods, such as the method signature as resolved from the constant pool, and the method's bytecode instructions. Content type 3 212 may represent the rest of the contents, such as the class source file name, the class access flags, the class name string resolved from the constant pool, the class name string of any classes extended resolved from constant pool, and the string value of the interfaces implemented by this class as resolved from the constant pool.

After the normalization process, the temporary file 214 may be arranged with content type 3 212 first, content type 1 208 second, and content type 2 210 last. No matter how the contents 208, 210, 212 are originally arranged, the normalized order of the temporary file 214 will be consistent across all files being compared using principles described herein.

Figure 3:
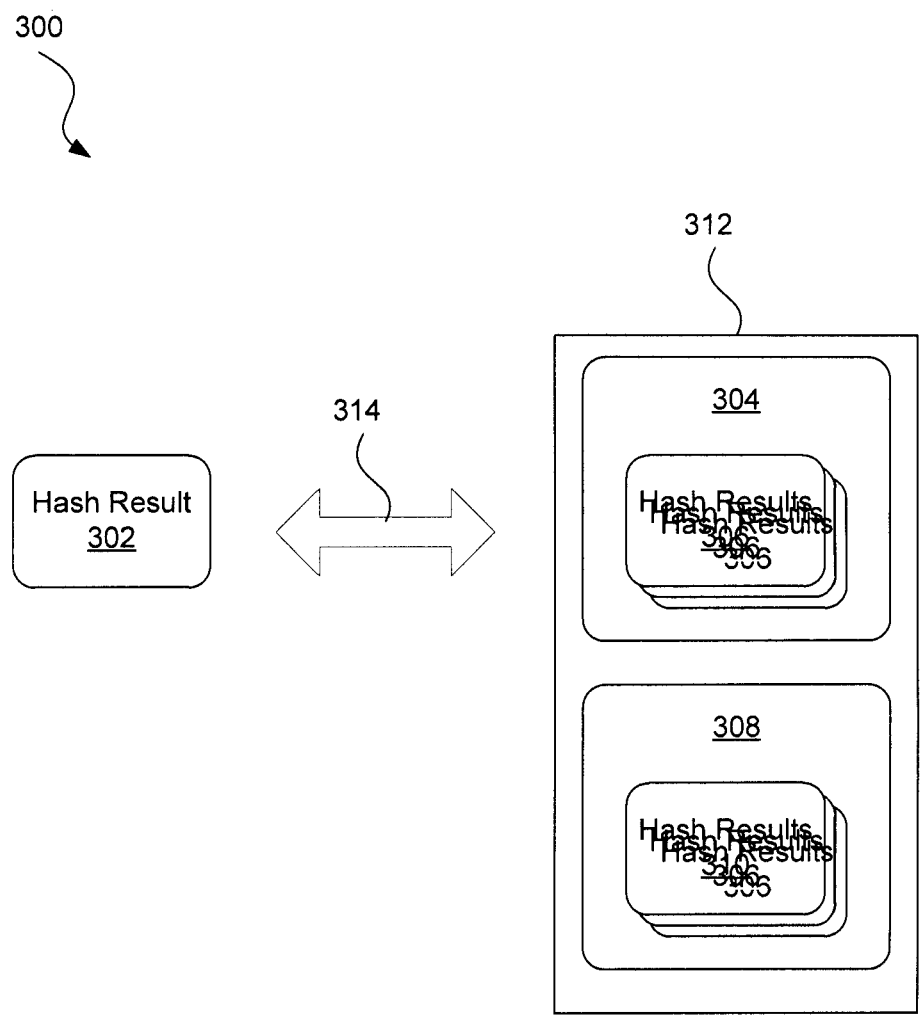
FIG. 3 is a diagram illustrating comparison of hash results, according to one example of principles described herein.

FIG. 3 is a diagram illustrating comparison of hash results. A hash result 302 from a particular normalized class file may be compared with a database of hash results 306, 310 to look for any matches. In general, it is desirable to compare hash results rather than the entire files themselves. In some cases, there may be thousands or millions of files to be compared. This would take an excessive and unnecessary amount of time to compare the entire class files themselves without performing the hash function.

According to certain illustrative examples, the hash result 302 can be compared to several other hash results 306, 310 that are stored in a database. The database 312 may be stored on a server and be accessible over a network. In some examples, the database 312 may be divided into categories 304. For example, a first category 304 may be hash results 306 from class files compiled from source code with known security vulnerabilities. In some examples, the category may include sub-categories for different types of security vulnerabilities.

A second category 308 may include hash results 310 compiled from source code that is subject to various intellectual property rights such as patent or copyright protection. In some examples, the category 308 may include sub-categories for different entities that hold various intellectual property rights. Thus, it can be readily determined if a particular class file is under any sort of licensing agreement or includes copyrighted material despite the compiler used to compile the source code.

Figure 4:
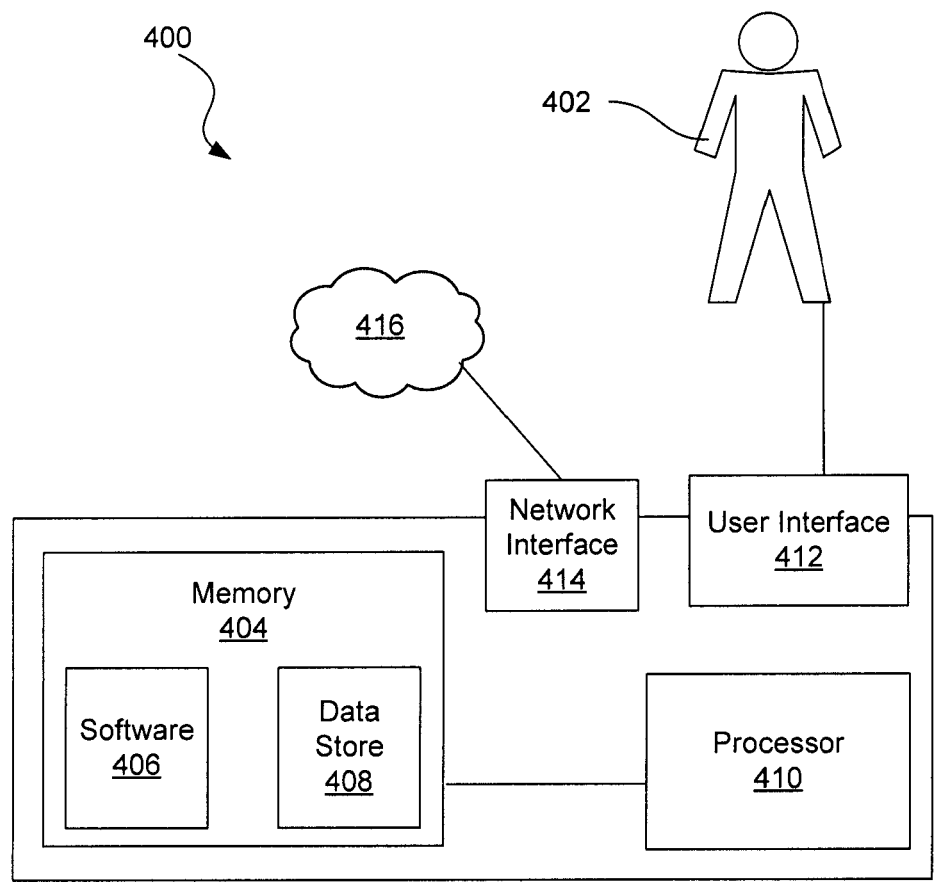
FIG. 4 is a diagram showing an illustrative computing system that can be used for class file normalization, according to one example of principles described herein.

FIG. 4 is a diagram showing an illustrative computing system that can be used for class file normalization. According to certain illustrative examples, the processing system 400 includes a memory 404 which may include software 406 and a data store 408. The processing system 400 also includes a processor 410, a network interface 414, and a user interface 412.

The memory 404 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 406 and data in the data store 408.

The processing system 400 also includes a processor 410 for executing the software 406 and using or updating the data 408 stored in memory 404. The software 406 includes sets of machine readable instructions that when executed by the processor 410, cause the system 400 to perform various tasks. The software 406 may include an operating system and any other software applications a user may wish to install. The software 406 may include machine readable instructions that cause the system 400 to perform the normalization process as described above. The system 400 may also perform the hash function as described above.

The user interface 412 may include a number of input devices such as a mouse, touchpad, or touchscreen that allow the user 402 to interact with the computing system 400. The user interface 412 may also include a number of different types of output devices such as a monitor or a touchscreen. The user interface allows the user 402 to interact with the processing system 400 in a manner as described above.

The network interface 414 may include hardware and software that allows the processing system 400 to communicate with other processing systems over a network 416. The network interface 414 may be designed to communicate with the network 416 through hardwire media such as Ethernet, coaxial, fiber-optic, etc. The network interface 416 may also be designed to communicate with the network 416 using wireless technologies. The network interface 414 allows a user to connect to external databases for purposes of comparing hash results to various databases of hash results.

Figure 5:
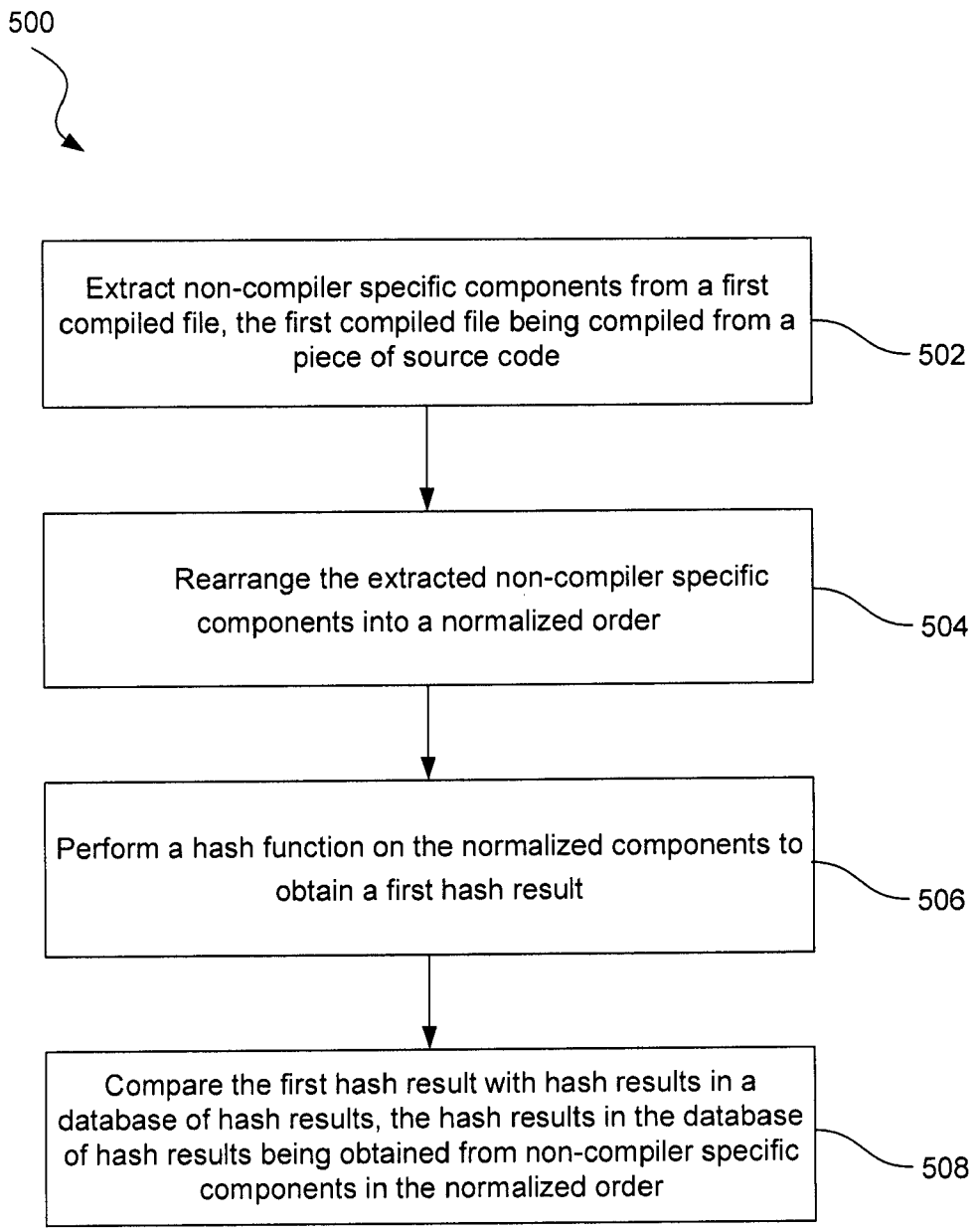
FIG. 5 is a flowchart showing an illustrative method for compiled file normalization, according to one example of principles described herein.

FIG. 5 is a flowchart showing an illustrative method 500 for compiled file normalization. According to certain illustrative examples, the method 500 includes extracting 502 non-compiler specific components from a first compiled file, the first compiled file being compiled from a piece of source code. Thus, various components of the compiled file that are not specific to any particular compiler are extracted. For example, components such as compiler identification information and the constant pool are not extracted.

The compiled file may be, for example, a java class file comprising bytecode. Java bytecode is compiled from source code written in the java programming language. The bytecode is designed for execution on a java virtual machine. The java virtual machine is then designed to convert the bytecode to whatever format is appropriate for the processor architecture that will ultimately be executing the program. In some examples, the compiled file may be an assembly file that was compiled from source code written in another programming language such as C++.

The method 500 further includes rearranging 504 the extracted non-compiler specific components into a normalized order. The normalized order is one that is consistently applied to many different class files being compared. Using this universal order, class files from the same source code, but compiled by different compilers, are significantly more likely to match when hash results of those class files are compared. The normalized contents may be stored as a set of data in working memory and not be transferred to a non-volatile memory store.

The method 500 further includes performing a hash function on the normalized components to obtain a first hash result. The hash function may be a standard one-way hash function that produces a specific output based on a specific input. A typical hash function will produce a different output if there are slight changes in the input. Various different types of hash functions may be used with systems and methods incorporating principles described herein.

The method 500 further includes, comparing the first hash result with hash results in a database of hash results, the hash results in the database of hash results being obtained from non-compiler specific components in the normalized order. As described above, hash results from pieces of source code having a specific characteristic may be stored in a database. The specific characteristic may be a security vulnerability or being subject to an intellectual property right or licensing agreement.

Figure 6:
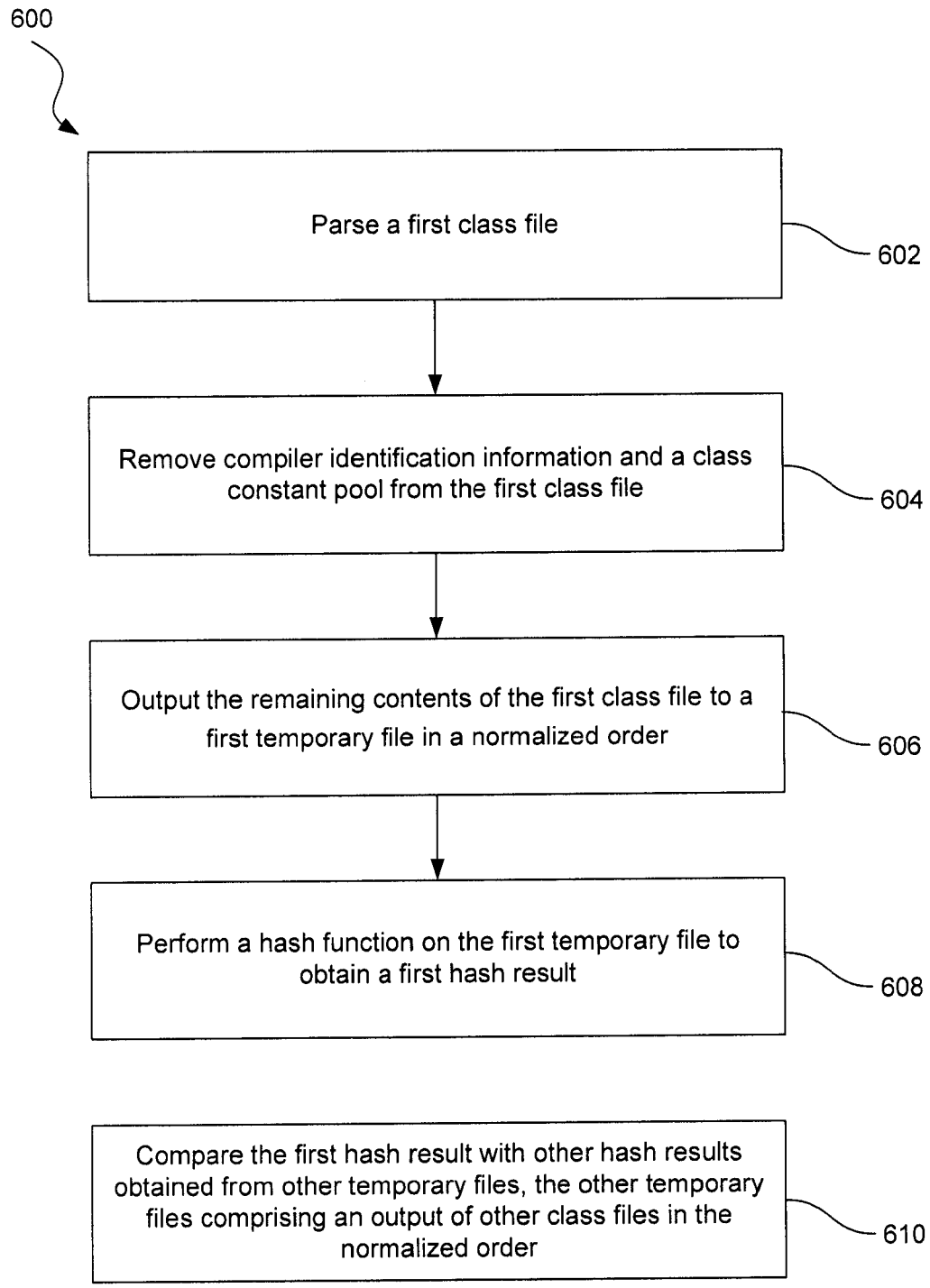
FIG. 6 is a flowchart showing an illustrative method for class file normalization, according to one example of principles described herein.

FIG. 6 is a flowchart showing an illustrative example for class file normalization. According to certain illustrative examples, the method 600 includes parsing a first class file in step 602. The parsing process includes analysis of the class file so that certain components are identified. For example, the compiler identification information can be identified. Additionally, the class constant pool, and components of the constant pool can be identified.

The method 600 further includes removing compiler identification information and a class constant pool from the first class file in step 604. The compiler identification information may include metadata about the compiler such as what compiler compiled the class file and the compiler settings at the time. The compiler identification information may include any type of compiler watermark. The class constant pool is also removed.

The method 600 further includes outputting the remaining contents of the first class file to a first temporary file in a normalized order in step 606. The normalized order is one that is consistently applied to many different class files being compared. Using this universal order, class files from the same source code, but compiled by different compilers, are significantly more likely to match when hash results of those class files are compared.

The temporary file is a collection of the class file data and is not necessarily stored in a particular file format. The temporary file is used to put the remaining class content in a particular order for the purpose of applying the hash function to obtain a hash result. Thus, the temporary file may be in volatile memory only and not be transferred to a non-volatile memory store. In some cases, the temporary file may only be placed in a processor cache if the cache is large enough to handle the file. After the hash function is applied, the temporary file may be discarded.

The method 600 further includes performing a hash function on the first temporary file to obtain a first hash result in step 608. The hash function may be a standard one-way hash function that produces a specific output based on a specific input. A typical hash function will produce a different output if there are slight changes in the input. Various different types of hash functions may be used with systems and methods incorporating principles described herein.

The method 600 further includes, in step 610, comparing the first hash result with other hash results obtained from other temporary files, the other temporary files comprising an output of other class files in the normalized order. As described above, the other hash results may be stored in a database. The other hash results may be categorized for the purpose of different comparisons. For example, if it is desirable to determine whether a particular class file has a known security vulnerability, then it may be desirable to compare the hash result of the particular class file with the hash results of the security vulnerability database.

Some examples of processing systems described herein may include non-transient, tangible, machine readable media that include executable code that when run by one or more processors (e.g., processor 410) may cause the one or more processors to perform the processes of methods 500 and 600 as described above. Some common forms of machine readable media that may include the processes of methods 500 and 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:

with the computing system, removing compiler specific components from a first compiled file, the first compiled file being compiled from a piece of source code, the compiler specific components comprising a constant pool and compiler identification information that identifies a compiler, the first compiled file comprising non-compiler specific components that include data resolved from the constant pool;

with the computing system, rearranging the non-compiler specific components into a normalized order, the normalized order being used to consistently arrange a plurality of compiled files, wherein the normalized order includes an order for: a class source file name, a class access flag, a class name string resolved from the constant pool, a class name string of any extended classes resolved from the constant pool, and a string value of interface implemented by the class as resolved from the constant pool;

with the computing system, performing a hash function on the normalized components to obtain a first hash result;

with the computing system, comparing the first hash result with a first of a plurality of hash results in a database of hash results, the first of the plurality of hash results derived from pieces of source code that have a first specified characteristic, the first specified characteristic comprising one of a security vulnerability, being subject to an intellectual property right, or being subject to a licensing agreement, the plurality of hash results in the database of hash results being obtained from non-compiler specific components in the normalized order; and with the computing system, comparing the first hash result with a second of the plurality of hash results, the second of the plurality of hash results derived from pieces of source code that have a second specified characteristic that is different from the first specified characteristic, the second specified characteristic comprising one of a security vulnerability, being subject to an intellectual property right, or being subject to a licensing agreement.

2. The method of claim 1, further comprising:
extracting non-compiler specific components from a second compiled file;
rearranging the extracted non-compiler specific components of the second compiled file into a normalized order; and
performing the hash function on the normalized components of the second compiled file to obtain a second hash result.

3. The method of claim 2, further comprising, comparing the first hash result and the second hash result to determine whether the first compiled file and the second compiled file were both compiled from the piece of source code.

4. The method of claim 2, wherein the first compiled file is compiled by a first compiler and the second compiled file is compiled by a second compiler, the second compiler being different from the first compiler.

5. The method of claim 1, wherein the first hash result is placed in a database of hash results.

6. The method of claim 1, further comprising, comparing the first hash result to a hash result derived from a piece of source code with a known security vulnerability.

7. The method of claim 1, wherein the normalized order includes a sub-order for each field of the class, the sub-order including: an access flag for the field, a name of the field as resolved from the constant pool, and a field signature as resolved from the constant pool.

8. The method of claim 1, wherein the normalized order includes a sub-order for each method of the class, the sub-order including: an access flag for a field, a name of the field as resolved from the constant pool, a method signature as resolved from the constant pool, and the method's bytecode instructions.

9. The method of claim 1, wherein the non-compiler specific components exclude compiler identification information.

10. The method of claim 1, wherein the non-compiler specific components exclude a constant pool.

11. The method of claim 1, wherein the first compiled file is a java class file comprising java bytecode.

12. A computing system comprising:
a processor; and
a memory comprising machine readable instructions that when executed by the processor, cause the system to:
for each of a plurality of class files:
parse the class file;
remove compiler identification information from the class file, the compiler identification information identifying a compiler;
remove constant pool definitions from the class file while leaving data resolved from the constant pool;
output remaining contents of the class file to a temporary file in a normalized order, wherein the normalized order includes an order for: a class source file name, a class access flag, a class name string resolved from the constant pool, a class name string of any extended classes resolved from the constant pool, and a string value of interface implemented by the class as resolved from the constant pool;
perform a hash function on each temporary file to obtain a plurality of hash results; and
compare the hash results to determine whether the plurality of class files were compiled from a same piece of source code;
wherein the plurality of hash results are compared with a first database hash result from a database, the database hash result being derived from a temporary file of a first category while having the normalized order, the first category comprising at least one of a security vulnerability, being subject to an intellectual property right, or being subject to a licensing agreement; and
wherein the plurality of hash results are compared with a second database hash result from a database, the database hash result being derived from a temporary file of a second category while having the normalized order, the second category comprising at least one of a security vulnerability, being subject to an intellectual property right, or being subject to a licensing agreement, the second category being different than the first category.

13. The system of claim 12, wherein the plurality of class files were compiled from at least two different compilers.

14. A non-transitory, machine-readable medium comprising a set of machine readable instructions that when executed by a processor, cause the processor to:

remove compiler-specific components from a first compiled file, the compiler specific components including a constant pool, the first compiled file being compiled from a piece of source code, the first compiled file including non-compiler specific components that includes data resolved from the constant pool;

rearrange the non-compiler specific components into a normalized order, wherein the normalized order includes an order for: a class source file name, a class access flag, a class name string resolved from the constant pool, a class name string of any extended classes resolved from the constant pool, and a string value of interface implemented by the class as resolved from the constant pool;

perform a hash function on the normalized components to obtain a first hash result;

compare the first hash result with a set of hash results derived from pieces of source code having a first specific characteristic, the first specific characteristic comprising one of a security vulnerability, being subject to an intellectual property right, or being subject to a licensing agreement, each of the set of hash results being obtained from the normalized order of non-compiler specific components of compiled files, the compiled files being from the pieces of source code having the first specific characteristic; and compare the first hash result with a set of hash results derived from pieces of source code having a second specific characteristic that is different than the first specific characteristic, the second specific characteristic comprising one of a security vulnerability, being subject to an intellectual property right, or being subject to a licensing agreement, each of the set of hash results being obtained from the normalized order of non-compiler specific components of compiled files, the compiled files being from the pieces of source code having the second specific characteristic.

15. The machine readable medium of claim 14, wherein the first specific characteristic is one of: a known security vulnerability and being subject to an intellectual property right.

16. The machine readable medium of claim 15, wherein the first compiled file comprises a java class file comprising java bytecode.

* * * * *